(12) United States Patent
Kwon (10) Patent No.: US 8,475,320 B2
(45) Date of Patent: Jul. 2, 2013

(54) BEARING PRELOAD ADJUSTER

(75) Inventor: Ryong-Uk Kwon, Windsor (CA)

(73) Assignee: American Axle & Manufacturing, Inc., Detroit, MI (US)

( * ) Notice: Subject to any disclaimer, the term of this patent is extended or adjusted under 35 U.S.C. 154(b) by 211 days.

(21) Appl. No.: 13/111,305

(22) Filed: May 19, 2011

(65) Prior Publication Data
US 2012/0295753 A1 Nov. 22, 2012

(51) Int. Cl.
*F16H 48/06* (2006.01)
(52) U.S. Cl.
USPC ............ 475/230; 384/517; 384/518; 384/563
(58) Field of Classification Search
USPC .................. 384/517, 518, 563; 475/220, 230, 475/245–248
See application file for complete search history.

(56) References Cited

U.S. PATENT DOCUMENTS

| | | | | |
|---|---|---|---|---|
| 2,546,969 | A | * | 4/1951 | Buckendale .................... 475/246 |
| 4,913,564 | A | * | 4/1990 | Stephan et al. ................ 384/518 |
| 5,046,870 | A | | 9/1991 | Ordo |
| 5,624,345 | A | * | 4/1997 | Graft et al. ..................... 475/230 |
| 6,357,927 | B1 | | 3/2002 | Myers et al. |
| 6,474,873 | B1 | | 11/2002 | Krisher et al. |
| 7,108,428 | B2 | | 9/2006 | Ason |
| 7,775,928 | B2 | | 8/2010 | Zink |
| 7,794,153 | B2 | | 9/2010 | Szczepanski et al. |
| 2006/0083454 | A1 | | 4/2006 | Ason et al. |
| 2009/0082162 | A1 | | 3/2009 | Zink |
| 2009/0145683 | A1 | | 6/2009 | Szczepanski et al. |

OTHER PUBLICATIONS

International Search Report and Written Opinion of the International Searching Authority dated Nov. 30, 2012, for International Application No. PCT/US2012/036714.

\* cited by examiner

*Primary Examiner* — Justin Holmes
(74) *Attorney, Agent, or Firm* — Harness, Dickey & Pierce, P.L.C.

(57) ABSTRACT

A bearing preload adjuster assembly can include a first annular member defining a first outer wall having a threaded region and a first inner wall having a plurality of first ramped surfaces formed thereon. The first outer wall can threadably engage a corresponding threaded region of an axle assembly. A second annular member can define a second outer wall having a plurality of second ramped surfaces formed thereon and can be received in the first annular member such that the second outer wall faces the first inner wall. A biasing member can bias the second annular member in a first axial direction such that the plurality of second ramped surfaces are in selective meshed engagement with the plurality of first ramped surfaces. A retaining member can be coupled to the first inner wall and can retain the biasing member and second annular member within the first annular member.

28 Claims, 8 Drawing Sheets

BEARING PRELOAD ADJUSTER

FIELD

The present disclosure relates generally to a bearing preload adjuster.

BACKGROUND

Automotive drive axles can include a differential assembly having a gear set that is supported within a differential housing to facilitate relative rotation between a pair of output shafts. The gear set typically includes a pair of helical side gears that are splined to the ends of axle shafts. The helical side gears are meshed with paired sets of helical pinions generally supported on a cross pin coupled to the differential housing. In response to speed differentiation between the output shafts, torque transmitted through meshed engagement of the side gears and pinions generates thrust forces that are exerted by the gear components against the wall surface of the differential housing to frictionally limit the speed differentiation and proportionally deliver torque between the output shafts.

In addition, many automotive drive axles include a hypoid gear set for changing the direction of power transmission from an axis parallel to the direction of vehicle travel to an axis perpendicular thereto. The hypoid gear set includes a ring gear coupled to the differential housing and a pinion gear journally supported within the axle housing. To facilitate proper function of the drive axle assembly, the differential can be mounted on a pair of slidable differential bearings.

In one arrangement, a sleeve and insert assembly is pressed into the axle housing outboard of the differential bearing. The sleeve typically includes castle extensions formed on an outer face for engagement with an adjustment tool. The sleeve is rotatably driven relative to the insert with the adjustment tool and toward the differential bearing. The differential bearing preload and hypoid gear backlash are then measured. The sleeve may be adjusted accordingly to achieve a desired measurement. Once the desired preload and backlash are set, a clip is positioned in engagement with adjacent castles on the sleeve to lock the sleeve relative to the axle housing and, consequently, maintain the desired bearing preload and backlash. The clip is typically held in a pocket machined in the axle housing by grease prior to deflection. Once deflected, the clip is retained on a first end by adjacent castles on the sleeve and retained on an opposite end by the axle housing pocket.

While the above arrangement has been useful in retaining the differential bearings at the desired location, the assembly process can be complicated and time consuming. Therefore, there remains a need in the art for an improved arrangement for setting bearing preload.

SUMMARY

This section provides a general summary of some aspects of the present disclosure, and is not a comprehensive listing or detailing of either the full scope of the disclosure or all of the features described therein.

In one aspect, a bearing preload adjuster assembly is provided according to the principles of the present disclosure. The bearing preload adjuster assembly can include a first annular member, a second annular member, a biasing member and a retaining member. The first annular member can define a first outer wall and a first inner wall. The first outer wall can have a threaded region, and the first inner wall can have a plurality of first ramped surfaces formed thereon. The first outer wall can be adapted to threadably engage a corresponding threaded region of an axle assembly. The second annular member can define a second outer wall having a plurality of second ramped surfaces formed thereon. The second annular member can be received in the first annular member such that the second outer wall faces the first inner wall of the first annular member. The biasing member can bias the second annular member in a first axial direction such that the plurality of second ramped surfaces are in selective meshed engagement with the plurality of first ramped surfaces of the first annular member. The retaining member can be coupled to the first inner wall of the first annular member and can retain the biasing member and second annular member within the first annular member.

In another aspect, an axle assembly is provided according to the principles of the present disclosure. The axle assembly can include an axle housing, a differential assembly and a bearing preload adjuster assembly. The differential assembly can be supported in the housing with a differential bearing positioned in a bore defined by the axle housing. The bearing preload adjuster assembly can be positioned within the bore and can be configured to engage the differential bearing and impart a preload force thereon. The bearing preload adjuster assembly can include a first annular member, a second annular member and a biasing member. The first annular member can define a first outer wall, a first inner wall, a first outer end face and an opposite first inner end face. The first outer wall can have a threaded region configured to threadably engage a corresponding threaded region in the bore, and the first inner end face can be configured to engage the differential bearing. The second annular member can define a second outer wall, a second inner wall, a second outer end face and an opposite second inner end face. The second annular member can be selectively movably positioned within the first annular member such that second inner end face is positioned axially between the first inner and outer end faces. The biasing member can be positioned within the first annular member between the first inner end face and the second inner end face. The biasing member can be configured to bias the second outer end face in a first axial direction into engagement with the first annular member.

In yet another aspect, a method for setting and maintaining a differential bearing preload in an axle assembly is provided according to the principles of the present disclosure. The method can include threadably engaging an outer annular member of a bearing preload adjuster assembly to a bore formed in the axle assembly. The outer member can be rotatably advanced in a first axial direction into engagement with the differential bearing. An inner annular member positioned within the outer annular member can be rotated in a first rotational direction to selectively rotate the outer annular member and axially advance the bearing preload adjuster assembly in the first axial direction to impart a predetermined preload on the differential bearing. The inner annular member can be rotated to rotate the outer annular member and axially advance the bearing preload adjuster assembly in the first axial direction until the inner annular member rotates relative to the outer annular member thereby indicating the predetermined bearing preload has been imparted on the differential bearing.

Further areas of applicability will become apparent from the description provided herein. The description and specific examples in this summary are intended for purposes of illustration only and are not intended to limit the scope of the present disclosure.

DRAWINGS

The present teachings will become more fully understood from the detailed description, the appended claims and the following drawings. The drawings are for illustrative purposes only of selected embodiments and not all possible limitations, and are not intended to limit the scope of the present disclosure.

DETAILED DESCRIPTION

The following description is merely exemplary in nature and is not intended to limit the present disclosure, its application, or uses. It should be understood that throughout the drawings, corresponding reference numerals indicate like or corresponding parts and features with the various elements in each view being drawn to scale. Although the following description relates generally to a preload adjuster assembly for a differential bearing in a drive axle assembly, it should be appreciated that the bearing preload adjuster assembly discussed herein can be applicable to other devices and/or systems where bearing preload adjustment and setting are required.

Figure 1:
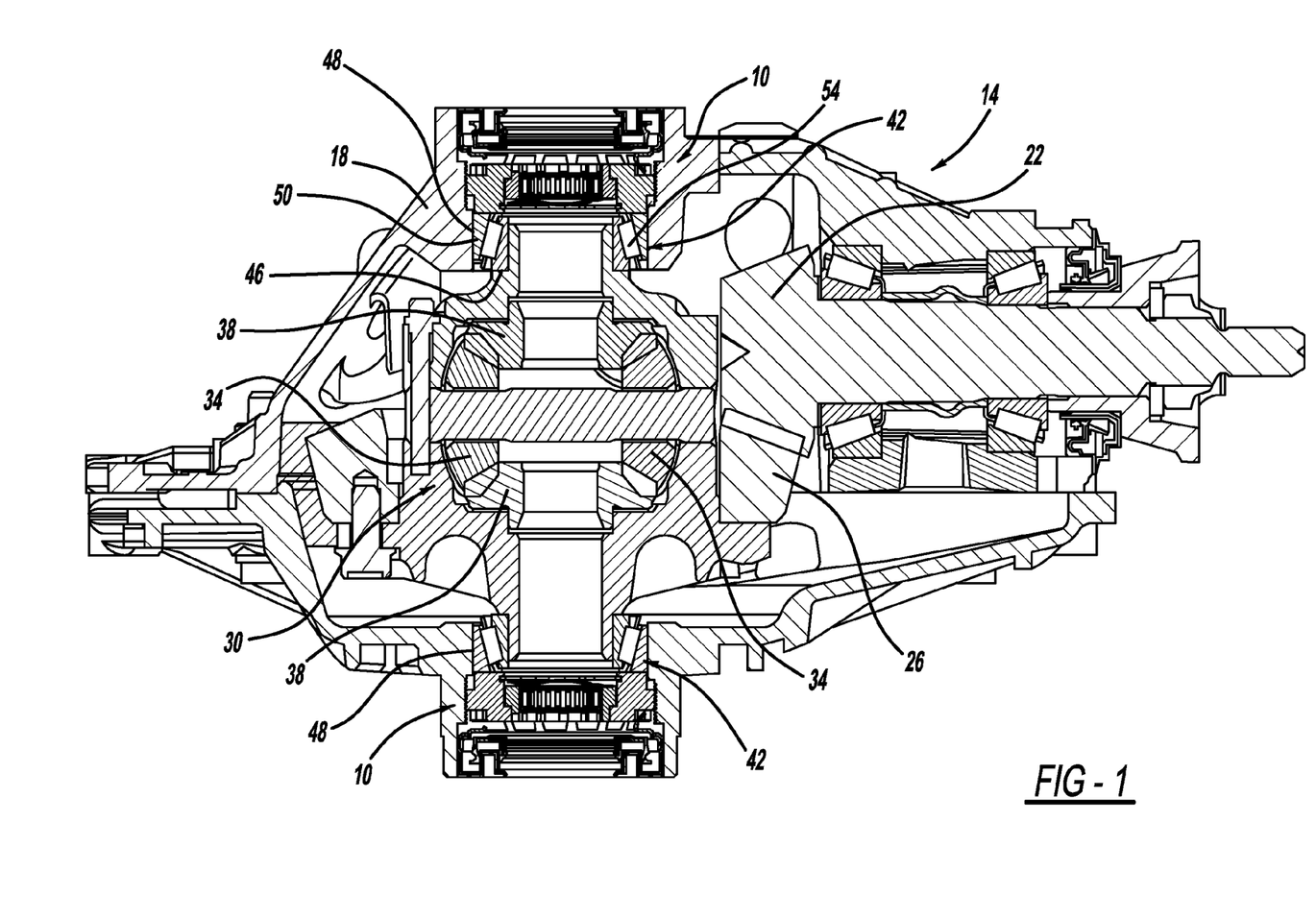
FIG. 1 is a partial sectional view of a drive axle assembly with the bearing preload adjuster assembly in accordance with the teachings of the present disclosure.

With reference to FIG. 1 of the drawings, a bearing preload adjuster assembly constructed in accordance with the teachings of the present disclosure is generally identified at reference numeral 10 and is shown operatively associated with an exemplary drive axle assembly 14. The drive axle assembly 14 is shown to generally include an axle/differential housing 18 for rotatably mounting a hypoid gear set including a pinion gear 22 and a ring gear 26 drivingly interconnected to a differential assembly 30.

The differential assembly 30 functions to transfer power to a pair of axle shafts (not shown) while compensating for any difference in axle shaft speed rotation as may occur during a turn or other steering maneuver. In order to compensate for a differential in axle shaft rotational speed, the differential assembly 30 can include a pair of pinion gears 34 and a pair of side gears 38 drivingly interconnected to the axle shafts. To facilitate proper function of the axle assembly 14, the differential assembly 30 can be rotatably mounted on a pair of differential bearings 42 positioned in bearing bores 48 defined by axle drive housing 18. In one exemplary configuration, bearings 42 can include tapered roller bearings having an inner race 46, an outer race or cup 50 and a plurality of tapered roller elements 54 disposed therebetween.

With additional reference to FIGS. 2-8, the bearing preload adjuster assembly 10 will now be discussed in greater detail. In one exemplary configuration, the bearing preload adjuster assembly 10 can operate to provide optimum differential bearing preload and hypoid gear set backlash. The bearing preload adjuster assembly 10 can include an outer member 60, an inner member 64, a biasing member 68 and a retaining member 72. In one exemplary configuration, outer member 60 can include a generally ring-shaped body 74 having an outer surface 76, an opposite inner surface 80, an inner end face 84 and an opposite outer end face 88. Outer surface 76 can include a threaded region 92 configured to threadably engage a corresponding threaded region 96 (FIG. 4) in bearing bores 48, as will be discussed below in greater detail. In the exemplary configuration illustrated, outer surface 76 can include an annular recessed portion 102 having a smaller diameter than a diameter of the threaded region 92 and can extend from the threaded region 92 to the inner end face 84. A plurality of castle extensions 104 can be formed in the outer end face 88 adjacent the outer surface 76 and can be configured for engagement with an installation tool and seal assembly, as will also be discussed below.

Figure 3:
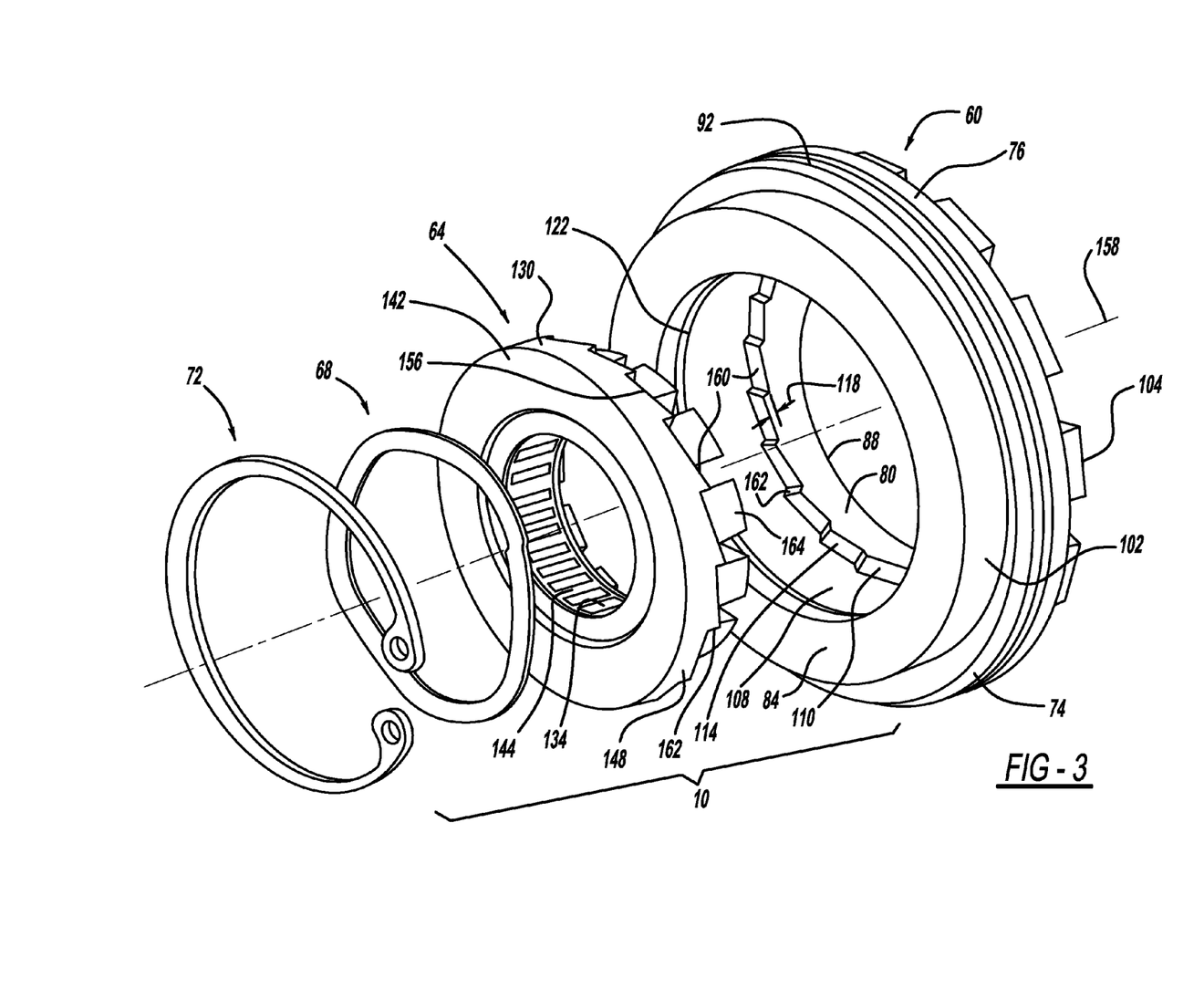
FIG. 3 is an exploded perspective view of the bearing preload adjuster assembly of FIG. 2 in accordance with the teachings of the present disclosure.

The inner surface 80 of outer member 60 can include an annular recessed region 108 extending from the inner end face 84 partially toward the outer end face 88 forming shoulder 110, as shown for example in FIG. 3. Shoulder 110 can include a plurality of ramped surfaces or teeth 114. As will be discussed below, the number and height 118 of the ramped surfaces can be varied to, in cooperation with the biasing member 68, set a desired predetermined preload for differential bearings 42. Inner surface 80 can also define an annular groove 122 proximate inner end face 84 for receipt of the retaining member 72, as will also be discussed below.

Figure 2:
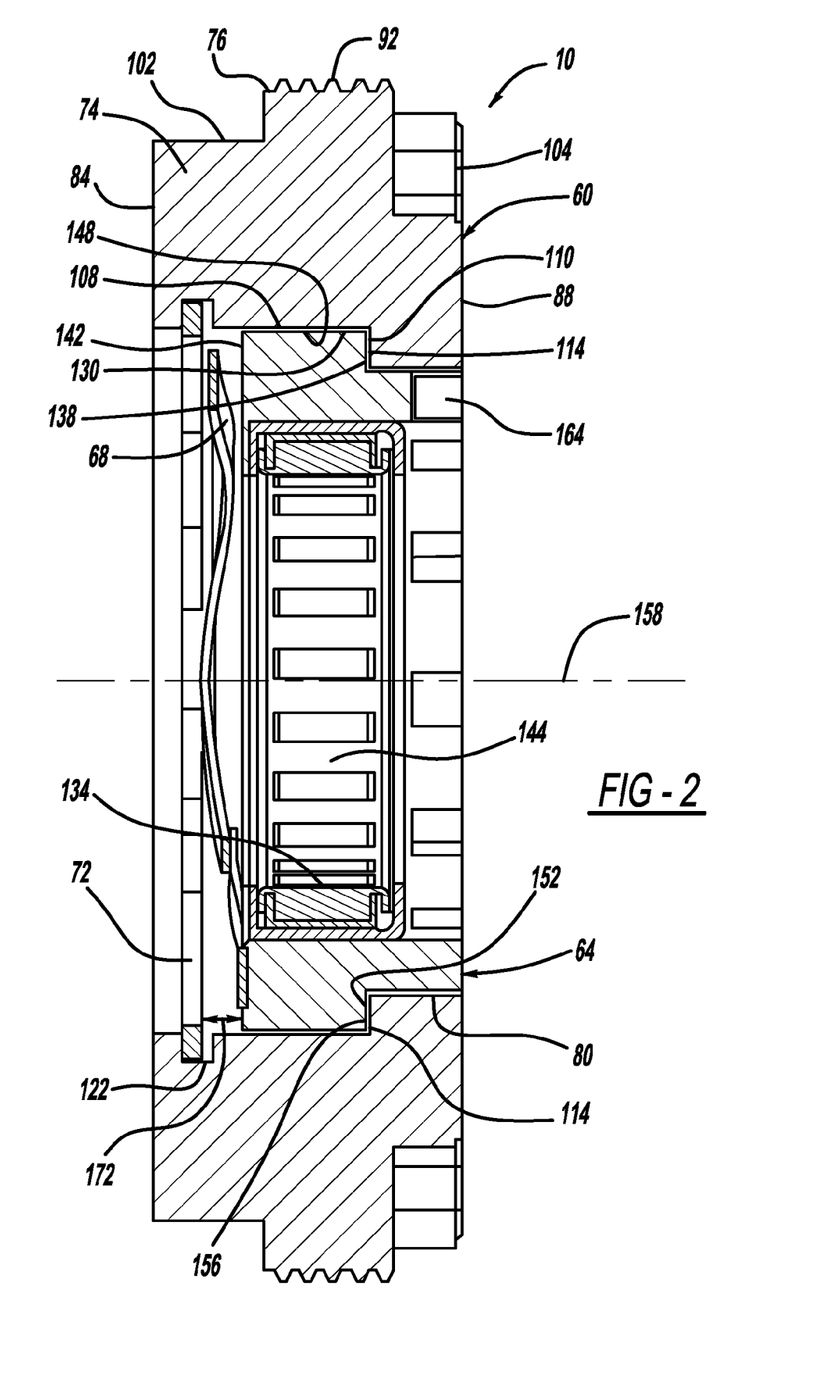
FIG. 2 is a sectional view of the bearing preload adjuster assembly of FIG. 1 in accordance with the teachings of the present disclosure.

Inner member 64 can similarly include an outer surface 130, an opposite inner surface 134, an outer end face 138 and an opposite inner end face 142. In one exemplary configuration, the inner surface 134 can be formed by a bearing, such as the exemplary needle bearing 144 shown in FIGS. 2 and 3. The outer surface 130 of inner member 64 can be sized and shaped to be received within outer member 60, as generally shown in FIGS. 2 and 3 and discussed below in greater detail. The outer surface 130 can include a first annular portion 148 having an outer diameter corresponding in dimension to an inner diameter of the annular recessed region 108 of outer member 60, as shown for example in FIG. 3. An outer radial surface 152 of the outer end face 138 can include a plurality of ramped surfaces or teeth 156 formed therein, as shown for example in FIGS. 2 and 3.

The ramped surfaces 156 of inner member 64 can be consistent in number and complimentary in shape with the ramped surfaces 114 of outer member 60. The ramped surfaces 156 of inner member 64 can mesh with the ramped surfaces 114 of outer member 60 when inner member 64 is received therein, as also shown in FIGS. 2 and 3 with reference to the schematic illustration in FIGS. 9A-9C. The ramped surfaces 156 of inner member 64 can be positioned at the same radial distance from a centerline 158 of the bearing preload adjuster assembly 10 as the ramped surfaces 114 of outer member 60. The ramped surfaces 114, 156 can each include a ramped portion 160 extending at an acute angle and terminating at a second portion 162 extending parallel or substantially parallel to the centerline 158. As will be discussed in greater detail below, the ramped surfaces 114, 156 can permit selective rotation of inner member 64 relative to outer member 60 in one rotational direction, such as clockwise, and prevent relative rotation in the opposite rotational direction.

Inner member 64 can also include a plurality of castle extensions 164 extending from the outer end face 138 and having an outer diameter substantially corresponding to the inner diameter of the inner surface 80 of outer member 60. In this regard, when inner member 64 is positioned within outer member 60, the castle extensions 164 can extend beyond the ramped surfaces 114 of outer member 60 toward the outer end face 88 thereof, as shown for example in FIG. 2. In one exemplary configuration, the castle extensions 164 can include an axial length so as to be flush or substantially flush with the outer end face 88 of outer member 60.

To construct the bearing preload adjuster assembly 10, inner member 64 can be removably positioned in outer member 60 such that the ramped surfaces 156 of inner member 64 engage and mesh with the ramped surfaces 114 of outer member 60, as shown for example in FIG. 2 with reference to FIG. 3. As discussed above, the annular portion 148 of inner member 64 can include an outer diameter corresponding to an inner diameter of the annular recessed region 108 and an outer diameter of the castle extensions 164 of inner member 64 can correspond to an inner diameter of the inner surface 80 of outer member 60, as also shown in FIG. 2. The inner member 64 can be configured to selectively rotate and axially translate relative to the outer member 60 in connection with driving the bearing preload adjuster assembly against one of the bearings 42 to set the predetermined preload, as will be discussed in greater detail below.

The inner member 64 can include an axial length from the ramped surfaces 156 to the inner end face 142 so as to provide a predetermined space or gap 172 between the inner end face 142 and the retaining member 72 in annular groove 122 of outer member 60, as shown in FIG. 2. The biasing member 68 can be positioned between the inner end face 142 of inner member 64 and the retaining member 72. The retaining member 72 can be removably positioned in the annular groove 122 and can movably retain the inner member 64 and spring member 68 within outer member 60. In the assembled configuration, the inner and outer members 64, 60, as well as the spring member 68 and retaining member 72, can be concentrically positioned about centerline 158.

In the exemplary configuration illustrated, biasing member 68 is a wave spring that can include a predetermined calibrated spring rate or force so as to apply a predetermined force against inner member 64 thereby biasing ramped surfaces 156 of inner member 64 against ramped surfaces 114 of outer member 60. In one exemplary configuration, wave spring 68 can include a relaxed width 180 (FIG. 9A) greater than the width of the gap 172 so as to bias inner member 64 into engagement with outer member 60 in an assembled configuration, as shown for example in FIG. 2. In the exemplary configuration illustrated, the height 118 of the ramped surfaces 114, 156 can be less than the available compression width of the wave spring 68 established by gap 172 of the bearing preload adjuster 10 in the assembled configuration. Retaining member 72 can be any member suitable for being removably positioned in annular groove 122 and providing retention of wave spring 68. In the exemplary configuration illustrated, retaining member 72 is a lock or snap ring configured to be removably positioned in groove 122 and provide retention as well as a reaction barrier for wave spring 68 and inner member 64.

Figure 4:
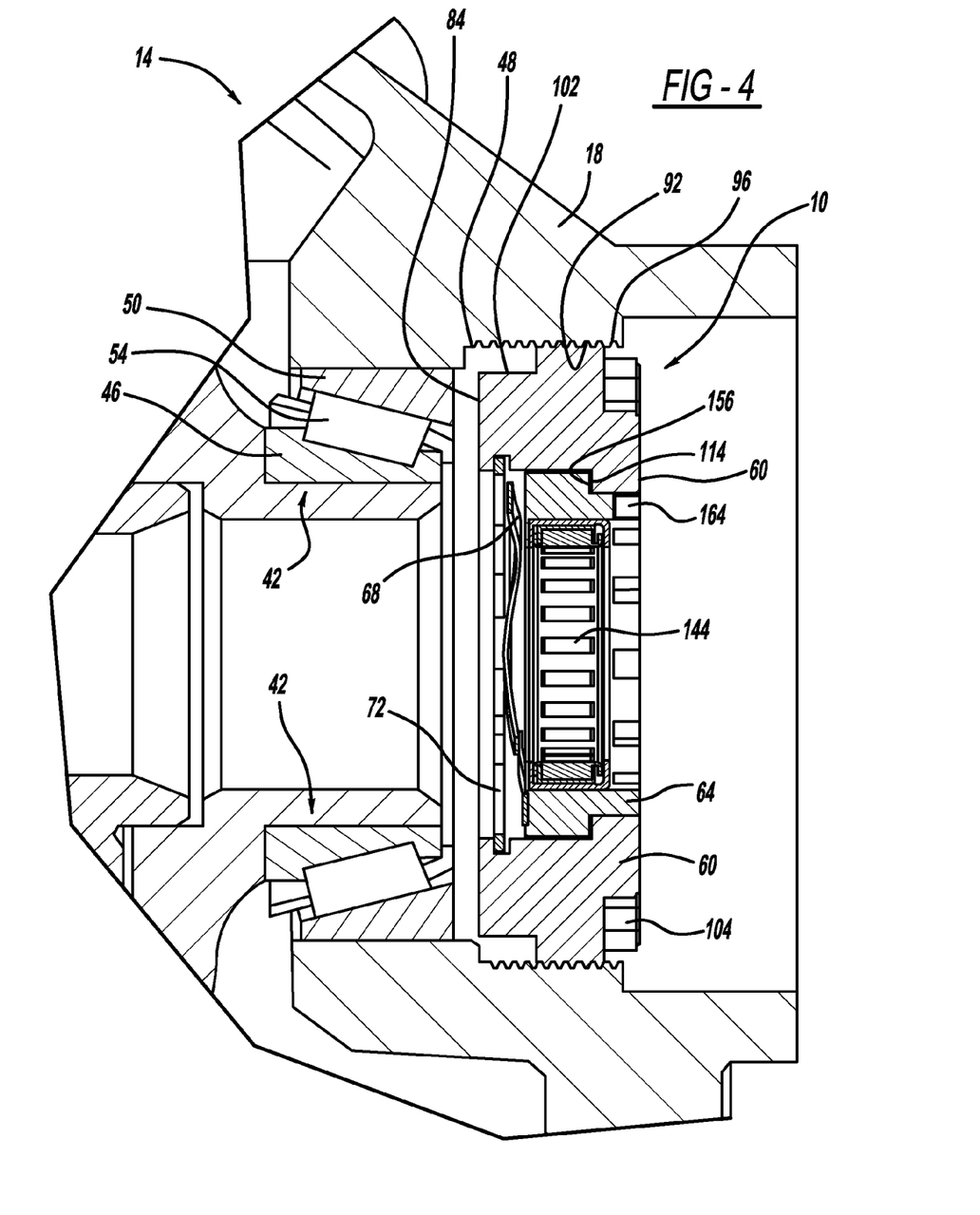
FIG. 4 is a partial sectional view of the bearing preload adjuster assembly installed in the axle housing and prior to engaging the bearing assembly in accordance with the teachings of the present disclosure.

In operation, and as will be discussed in greater detail below, the bearing preload adjuster assembly can be used to set a predetermined bearing 42 preload and proper ring gear to pinion gear placement. The bearing preload adjuster assembly 10, in the assembled configuration, can be positioned in each bore 48 such that the threaded region 92 of outer member 60 threadably engages the corresponding threaded region 96 of bores 48, as generally shown in FIG. 4. While only one side of the drive axle assembly is shown in FIGS. 4-6, it should be appreciated that the following discussion applies to the adjuster assembly 10 for use in both sides of the drive axle assembly 14, as shown for example in FIG. 1.

Once both bearing adjuster assemblies 10 are threadably engaged to the respective left and right side bores 48, each bearing preload adjuster assembly 10 can be advanced toward the respective bearing 42, as shown in FIG. 4. The bearing assemblies 10 can be advanced with an installation tool (not shown) for the outer member 60 that is similar to a preload setting tool 200 shown in FIGS. 7 and 8 used to engage the castle extensions 164 of inner member 64. The installation tool for the outer member 60 can similarly be used to engage the castle extensions 104 and rotate the outer member 60 relative to the axle housing 18 to axially advance the bearing preload adjuster assembly 10 toward the bearing 42. The outer member 60 can be rotated, as discussed above, such that the inner member 64 rotates with the outer member 60.

Figure 5:
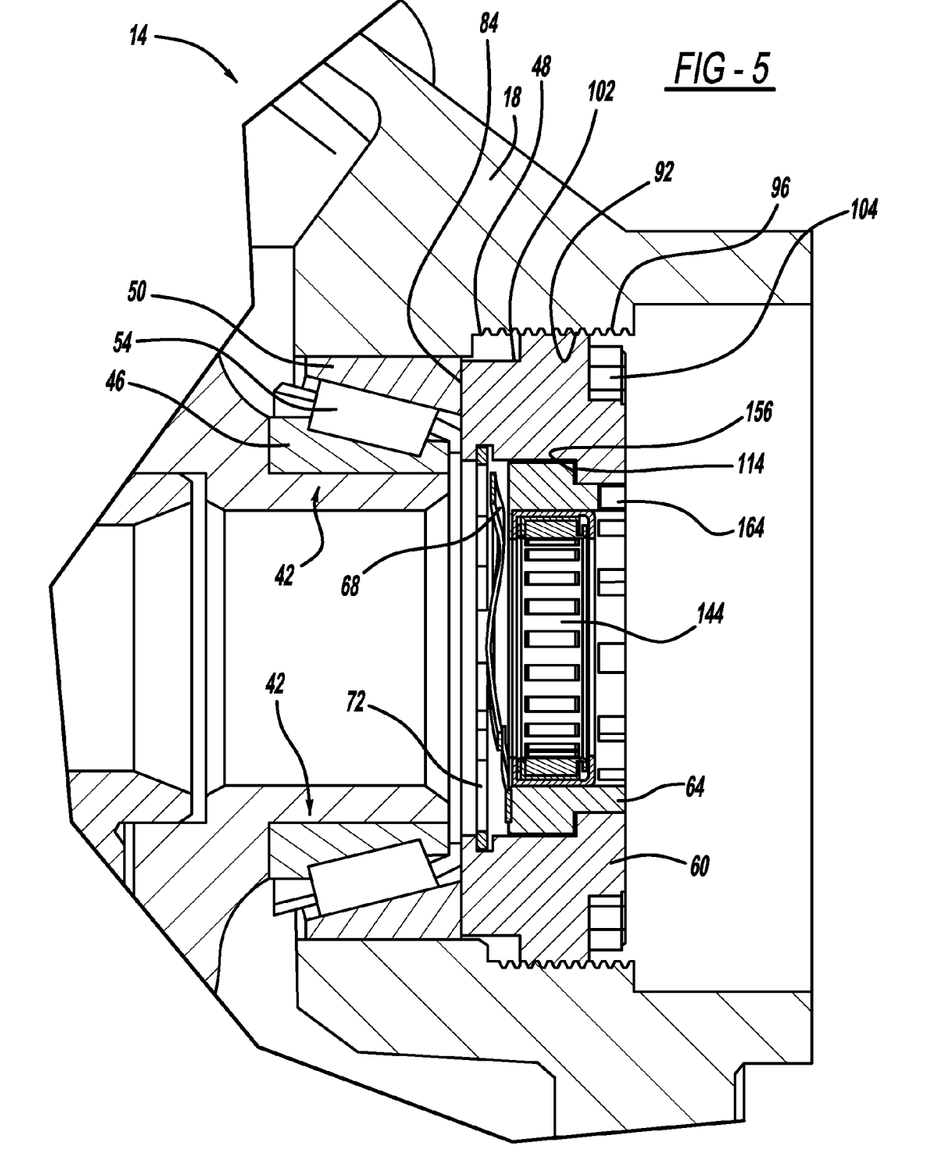
FIG. 5 is a partial sectional view of the bearing preload adjuster assembly installed in the axle housing and engaging the bearing assembly in accordance with the teachings of the present disclosure.
Figure 6:
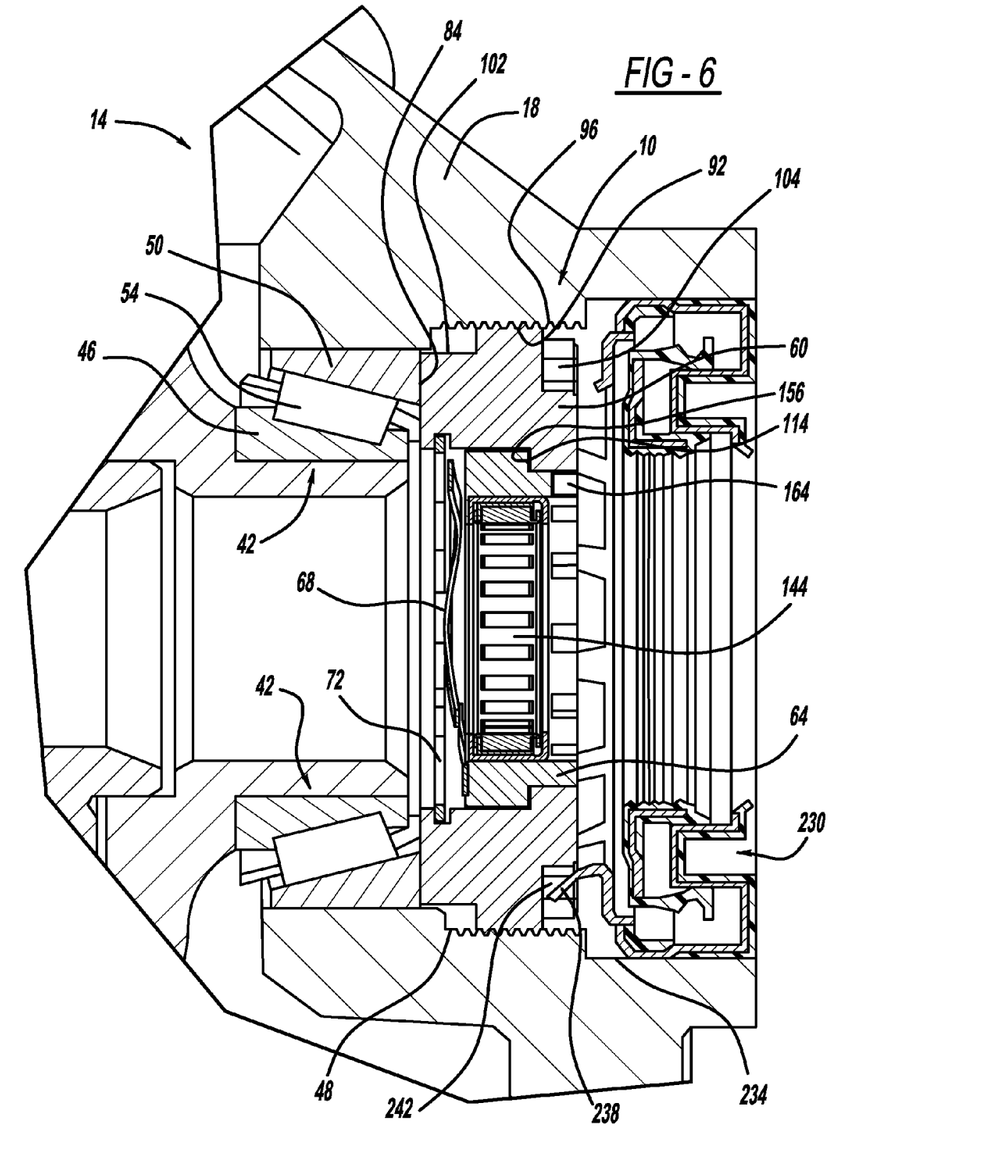
FIG. 6 is a partial sectional view of the arrangement shown in FIG. 5 and including a seal assembly installed in the axle housing in engagement with the bearing preload adjuster assembly in accordance with the teachings of the present disclosure.

Each bearing preload adjuster assembly 10 can be threadably advanced into engagement with the respective bearings 42 such that there is substantially minimal or zero preload applied to the bearings 42, as generally shown for example in FIG. 5. In the exemplary configuration illustrated, the outer member 60 can be brought into contact with the outer race 50 of bearing 42. The differential gearing can be inspected for proper placement relative to housing 18 and adjusted, if necessary. If adjustment is necessary, each bearing preload adjuster assembly 10 can be threadably retracted from the bearings 42 to perform such adjustment, and then rotatably driven again into engagement with the bearings 42 in the manner discussed above. With proper placement of the differential gearing and the bearing preload adjuster assemblies 10 contacting the outer races 50 of bearings 42, the predetermined preload can be placed on bearings 42 via the bearing preload adjuster assemblies, as will be discussed below.

Figure 7:
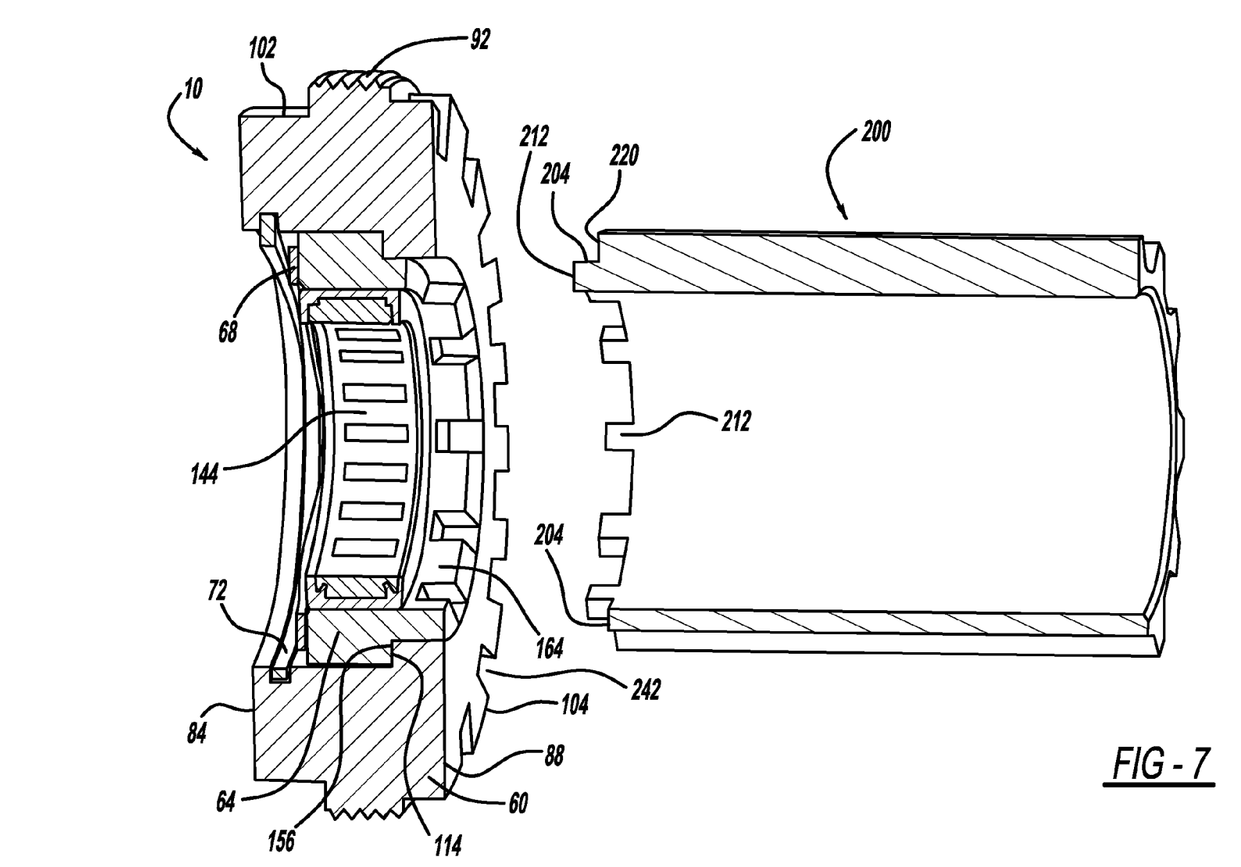
FIGS. 7 and 8 are partial sectional views of an installation tool for use in rotating an inner member of the bearing preload adjuster assembly in accordance with the teachings of the present disclosure.
Figure 8:
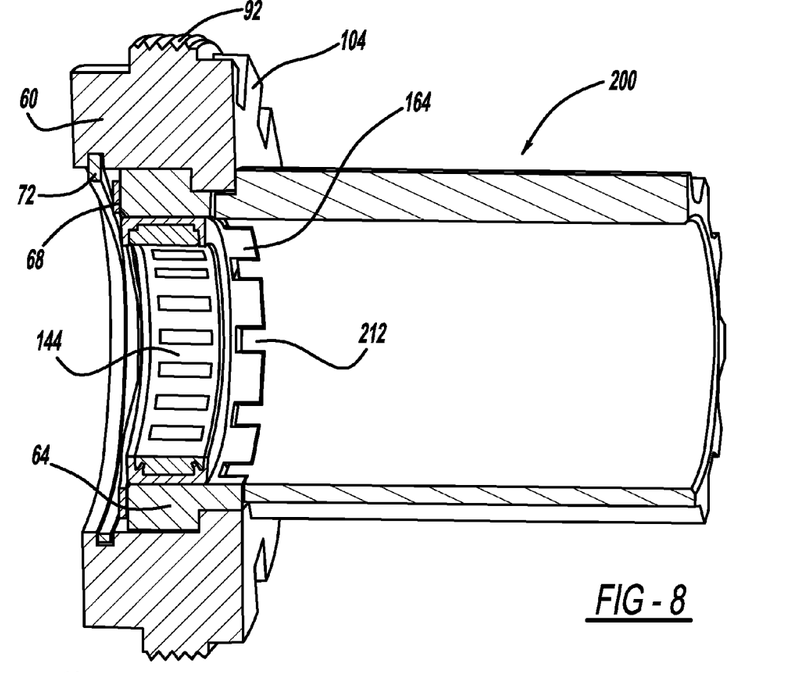

With reference to FIGS. 5-9, the preload setting tool 200 will now be described in connection with operation of the bearing preload adjuster assembly to set the predetermined preload on bearings 42. The preload setting tool 200 can include any suitable shape having a first end 204 configured to cooperate with castle extensions 164 of inner member 64. In the exemplary configuration illustrated, setting tool 200 can include a body 208 having castle extensions 212 formed in the first end 204. The castle extensions 212 can include a complimentary pattern to that of castle extensions 164, as shown in FIGS. 7 and 8. The first end 204 can also include an annular groove 216 forming a shoulder 220 having a larger outer diameter than an outer diameter of the inner member 64. The shoulder 220 can be configured to limit an amount of axial travel of the setting tool 200 relative to inner and outer members 60, 64.

In one exemplary configuration, the castle extensions 164 of inner member 64 can include an axial length greater than the complimentary castle extensions 212 of setting tool 200, as shown in FIG. 8. The annular groove 216 can also include an axial length 224 less than an axial length of castle extensions 212. In this regard, when setting tool 200 is removably coupled to inner member 64 such that the castle extensions 164 and 212 are in meshed engagement, the shoulder 220 can engage outer end face 88 of outer member 60 thereby preventing castle extensions 212 from engaging outer end face 138 of inner member 64, as also shown in FIG. 8. This configuration can prevent setting tool 200 from imparting an axial force on inner member 64.

With the setting tool 200 coupled to the inner member 64 via castle extensions 164, 212, the setting tool 200 can be used to turn the inner member 64 to further threadably advance the outer member 60 to apply the preload onto the outer race 50 of bearings 42. The preload can be increasingly applied until the torque to turn force, or rotational force, required to rotate the outer member 60 via the inner member 64 becomes equal to or greater than the biasing force from wave spring 68. Once the torque to turn force is greater than the spring force of wave spring 68, the ramped surfaces 156 of inner member 64 can begin to overcome the ramped surfaces 114 of outer member 60 and thereby compress the wave spring 68 by an amount equivalent to the height 118 of the ramped surfaces 114, 156. At this point, the inner member 64 can rotate relative to the outer member 60 such that further rotation of the inner member will no longer rotate the other member 60. In other words, and as will be further discussed below, rotating the inner member 64 can rotate the outer member 60 thereby threadably advancing the outer member 60 to apply the predetermined bearing preload until the torque to turn force of outer member 60 is greater than the resultant spring force in connection with the ramped surfaces 156 overcoming the ramped surfaces 114.

Figure 9A:
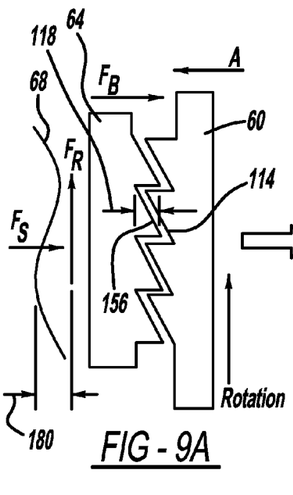
FIGS. 9A-9C are schematic views depicting an exemplary interaction of the inner member and an outer member of the bearing preload adjuster assembly in accordance with the teachings of the present disclosure.
Figure 9B:
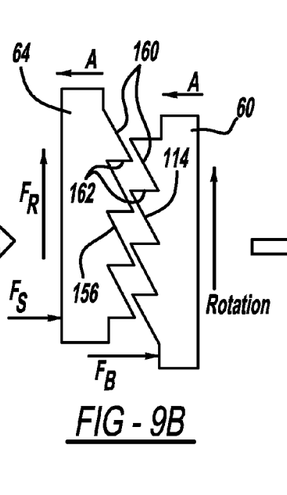
Figure 9C:
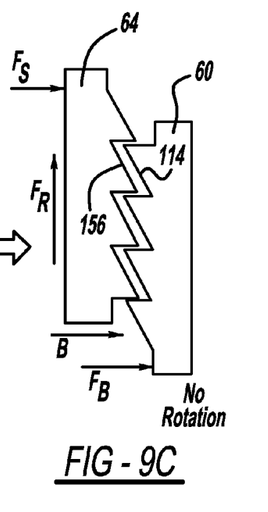

With reference to the schematic illustrations in FIGS. 9A-9C and continuing reference to FIGS. 2-8, operation of the inner member 64 relative to the outer member 60 will now be discussed in greater detail in connection with setting the predetermined bearing preload. As briefly discussed above, the spring force $F_s$ of wave spring 68 in connection with the height 118 of the ramped surfaces 114, 156 can establish a predetermined force $F_R$ that is required to rotate the inner member 64 relative to the outer member 60. The inner member 64 can be rotated from a rest position shown in FIG. 9A to a position where the ramped surfaces 156 of inner member 64 rotate over the corresponding ramped surfaces 114 of outer member 60, as generally shown in the transitions from FIG. 9A to FIG. 9C. During this rotation of inner member 64 relative to outer member 60, the inner member 64 can axially translate toward the inner end face 84 of outer member 60 by an amount of the height 118 of ramped surfaces 114, 156 thereby compressing wave spring 68 against retaining member 72.

Thus, once outer member 60 is engaged with bearing 42, the rotational force applied to the inner member 64 via setting tool 200 can rotate the outer member 60 and thereby threadably advance the outer member 60 in an axial direction A further against outer race 50 until the torque to turn force $F_R$ of the outer member 60, as a result of the bearing preload reaction force $F_B$ from outer race 50, is equal to or greater then the resultant force $F_s$ from compression of wave spring 68 by the height 118 of ramped surfaces 114, 156.

In other words, the outer member 60 will stop rotating (and applying further preload) once the torque to turn or rotational force $F_R$ becomes equal to or greater than the bearing preload reaction force $F_B$ established by the spring force $F_s$ resulting from compression of wave spring 68 by the height 118 of ramped surfaces 114, 156. Thus, further rotation of inner member 64 with setting tool 200 will no longer rotate outer member 60 relative to axle housing 18. At this point, the predetermined desired bearing preload has been imparted on bearing 42 and setting tool 200 can be removed from inner member 64. As shown in FIG. 9C, once inner member 64 rotates relative to outer member 60 such that ramped surfaces 156 index at least one full position relative to ramped surfaces 114, the inner member 64 can translate in an axial direction B back into meshed engagement with outer member 60 under the biasing force of wave spring 68.

The bearing preload adjuster assembly 10 can thus be used to set a predetermined bearing preload with automatic audible and tactile feel to a user indicating that the predetermined preload has been reached. In this regard, the bearing preload adjuster assembly 10 can be calibrated with the ramped surfaces having a selected ramp height and a wave spring 68 having a selected spring force to establish a predetermined torque to turn force that will be required to overcome the spring force and rotate the inner member ramped surfaces relative to the outer member ramped surfaces. This established predetermined force can equate to the predetermined bearing preload for bearings 42 or other suitable bearings. Thus, the bearing preload adjuster assembly can be configured with a wave spring 68 having various spring forces and/or ramped surfaces 114, 156 having various heights to establish various predetermined bearing preloads to be imparted on bearings of the drive axle assembly.

The bearing preload adjuster assembly 10 can also provide a less complex technique for setting bearing preloads in that the assembly 10 can be preconfigured with a specific wave spring and/or ramped surface heights to automatically set the desired preload upon the inner member rotating relative to the outer member without a further requirement to measure and preload and/or perform an iterative process of setting the preload. As discussed above, the bearing preload adjuster assembly 10 can also provide tactile and audible feedback to the user that the predetermined bearing preload has been reached via the clicking sound and feedback provide when the ramped surfaces 156 of inner member 64 are overcoming the ramped surfaces 114 of outer member 60.

Once the bearing preload has been set and tool 200 has been removed from bearing preload adjuster assembly 10, a seal 230 can be pressed into an outer portion 234 of bearing bores 48. In one exemplary configuration, seal 230 can include at least one axially extending projection 238 sized and shaped to fit in the notches 242 between castle extensions 104 of outer member 60. The at least one projection 238 can prevent the outer member 60 from rotating relative to the axle housing 18 to maintain the desired preload on bearings 42 via bearing preload adjuster assemblies 10. It should be appreciated that while seal 230 has been discussed above in connection with preventing rotation of outer member 60 relative to housing 18 other members with or without a sealing function could be coupled to the outer portion 234 and outer member 60 to prevent the above-discussed rotation.

While one or more specific examples have been described and illustrated, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof.

What is claimed is:

1. A bearing preload adjuster assembly, comprising:
a first annular member defining a first outer wall and a first inner wall, the first outer wall having a threaded region, the first inner wall having a plurality of first ramped surfaces formed thereon, the first outer wall adapted to threadably engage a corresponding threaded region of an axle assembly;
a second annular member defining a second outer wall having a plurality of second ramped surfaces formed thereon, the second annular member being received in the first annular member such that the second outer wall faces the first inner wall of the first annular member;
a biasing member biasing the second annular member in a first axial direction such that the plurality of second ramped surfaces are in selective meshed engagement with the plurality of first ramped surfaces of the first annular member; and
a retaining member coupled to the first inner wall of the first annular member and retaining the biasing member and second annular member within the first annular member.

2. The bearing preload adjuster assembly of claim 1, wherein the first and second annular members each comprise a castellated outer end face.

3. The bearing preload adjuster assembly of claim 1, wherein the plurality of first and second ramped surfaces are configured to cooperate to permit movement of the second annular member relative to the first annular member in one rotational direction and prevent relative movement in an opposite rotational direction.

4. The bearing preload adjuster assembly of claim 1, wherein the first annular member comprises a groove formed in the first inner wall, the retaining member being received in the groove; and
wherein the bearing preload adjuster assembly comprises a predetermined axial gap between the retaining member and an inner end face of the second annular member positioned opposite the second outer wall, the biasing member being positioned in the predetermined axial gap.

5. The bearing preload adjuster assembly of claim 4, wherein the plurality of first and second ramped surfaces each have the same height extending in an axial direction, the height being less than the predetermined axial gap to permit the plurality of second ramped surfaces to selectively rotate relative to the plurality of first ramped surfaces thereby translating the second annular member in a second axial direction opposite the first axial direction against the force of the biasing member.

6. The bearing preload adjuster assembly of claim 5, wherein the biasing member comprises a wave spring.

7. The bearing adjuster assembly of claim 6, wherein the retaining member comprises a lock ring, the wave spring being positioned between and in engagement with the lock ring and the second inner end face of the second annular member.

8. The bearing preload adjuster assembly of claim 1, wherein the first inner wall of the first annular member and the second outer wall of the second annular member comprise radially extending axially facing surfaces.

9. The bearing preload adjuster assembly of claim 8, wherein each of the plurality of first ramped surfaces and each of the plurality of second ramped surfaces comprise a first portion extending at an acute angle relative to the axially facing surface, the first portion terminating in an axially extending portion that extends parallel to a longitudinal axis of the bearing preload adjuster assembly.

10. The bearing preload adjuster assembly of claim 1, wherein the second annular member comprises a second inner surface defined by a bearing coupled to the second annular member.

11. A power transmitting component comprising:
a housing;
a differential assembly supported in the housing with a differential bearing positioned in a bore defined by the housing; and
a bearing preload adjuster assembly positioned within the bore and configured to engage the differential bearing and impart a preload force thereon, the bearing preload adjuster assembly comprising:
a first annular member defining a first outer wall, a first inner wall, a first outer end face and an opposite first inner end face, the first outer wall having a threaded region configured to threadably engage a corresponding threaded region in the bore, the first inner end face configured to engage the differential bearing;
a second annular member defining a second outer wall, a second inner wall, a second outer end face and an opposite second inner end face, the second annular member being selectively movably positioned within the first annular member such that second inner end face is positioned axially between the first inner and outer end faces; and
a biasing member positioned within the first annular member between the first inner end face and the second inner end face, the biasing member configured to bias the second outer end face in a first axial direction into engagement with the first annular member.

12. The power transmitting component of claim 11, further comprising a retaining member coupled to the first annular member and positioned between the first inner end face and the second inner end face, the biasing member being positioned between and in engagement with the retaining member and the second inner end face.

13. The power transmitting component of claim 12, wherein the first inner end face is in engagement with an outer race of the bearing, and wherein the retaining member is spaced apart a first axial distance from the first outer end face, and the second inner end face is spaced apart a second axial distance from the first outer end face, the second axial distance being greater than the first axial distance.

14. The power transmitting component of claim 12, wherein the biasing member comprises a wave spring and the retaining member comprises a lock ring, the lock ring being positioned in an annular groove formed in the first inner wall of the first annular member.

15. The power transmitting component of claim 11, further comprising:
a plurality of first ramped surfaces formed on the first inner wall of the first annular member; and
a plurality of second ramped surfaces formed on the second outer end face of the second annular member, the biasing member biasing the plurality of second ramped surfaces into selective meshed engagement with the plurality of first ramped surfaces.

16. The power transmitting component of claim 15, wherein the plurality of second ramped surfaces extend in the first axial direction and the plurality of first ramped surfaces extend in a second opposite axial direction.

17. The power transmitting component of claim 15, wherein the plurality of first ramped surfaces are formed on the first inner wall between the first inner and outer end faces of the first annular member.

18. The power transmitting component of claim 15, wherein the plurality of first and second ramped surfaces are configured to cooperate to permit rotation of the second annular member relative to the first annular member in a first rotational direction and prevent relative rotation in a second opposite rotation direction.

19. The power transmitting component of claim 18, wherein rotating the second annular member in the first rotational direction rotates the first annular member therewith to threadably advance the first annular member relative to the housing in the second axial direction to impart the preload force on the bearing; and
wherein upon a reaction force from the bearing imparted on the first outer end face being greater than a force required to rotate second annular member relative to the first annular member, rotating the second annular member in the first rotational direction will overcome the biasing force of the biasing member and rotate the second annular member relative to the first annular member.

20. The power transmitting component of claim 19, wherein the biasing member comprises a wave spring having a spring force calibrated to a predetermined preload for the bearing such that when the reaction force of the bearing is greater than the spring force, the second annular member is configured to overcome the spring force and translate in the second axial direction thereby compressing the wave spring and permitting the second annular member to rotate relative to the first annular member.

21. The power transmitting component of claim 11, further comprising a preload setting tool including:
a castellated first end sized and shaped to meshingly engage with a castellated second outer end face of the second annular member; and
an annular recess adjacent the first end of the tool, the annular recess having a predetermined axial length and forming a shoulder, the shoulder configured to engage the first outer end face of the first annular member when the tool is engaged with the second annular member to thereby prevent the first end of the tool from exerting an axial force on the second annular member.

22. The power transmitting component of claim 11, further comprising a seal assembly press fit into the bore, the seal assembly having an axial projection extending in a second axial direction opposite the first axial direction, the axial projection being received in a notch formed in the first outer end face of the first annular member, the seal assembly preventing rotation of the first annular member relative to the housing.

23. A method for setting and maintaining a predetermined bearing preload in a power transmitting component, the method comprising:
providing a bearing preload adjuster assembly having an inner annular member and a threaded outer annular member;
providing a housing with a case and a bearing received therein, the bearing supporting the case for rotation relative to the housing;
threading the outer annular member to the housing;
rotating the inner annular member in a first rotational direction relative to the housing to cause corresponding rotation of the outer annular member that generates an axial load that is transmitted between the outer annular member and the bearing; and
rotationally de-coupling the inner annular member from the outer annular member when the inner annular member is driven in the first rotational direction relative to the housing and the axial load transmitted between the outer annular member and the bearing is greater than or equal to the predetermined bearing preload.

24. A power transmitting component comprising:
a housing;
a case received in the housing;
a bearing supporting the case for rotation relative to the housing; and
a bearing preload adjuster having an output portion, an input portion and a torque clutch between the output and input portions, the output portion being threadably engaged to the housing and abutted against the bearing, the input portion being configured to receive a rotary input in a first rotational direction for setting an axial preload of the bearing, the axial preload being applied to the bearing through the output portion, the torque clutch being configured to rotational de-couple the input portion from the output portion when the input portion is rotated in the first rotational direction and the axial preload is greater than or equal to a predetermined load.

25. The power transmitting component of claim 24, wherein the torque clutch comprises first and second ratchet teeth, the first ratchet teeth being coupled to the input member for rotation therewith, the second ratchet teeth being coupled to the output member for rotation therewith.

26. The power transmitting component of claim 25, wherein a spring biases the first teeth in an axial direction toward the second teeth.

27. The power transmitting component of claim 26, wherein the spring is a leaf spring.

28. The power transmitting component of claim 24, wherein the case is a differential case and a differential gear set is received in the differential case.

* * * * *